(12) United States Patent
Porte et al.

(10) Patent No.: US 9,352,844 B2
(45) Date of Patent: May 31, 2016

(54) NACELLE INCORPORATING AN ELEMENT FOR CONNECTING A LIP AND AN ACOUSTIC ATTENUATION PANEL TOGETHER

(75) Inventors: Alain Porte, Colomiers (FR); Jacques Lalane, Saint Orens de Gameville (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 510 days.

(21) Appl. No.: 13/518,041

(22) PCT Filed: Dec. 21, 2010

(86) PCT No.: PCT/FR2010/052837
§ 371 (c)(1),
(2), (4) Date: Jun. 21, 2012

(87) PCT Pub. No.: WO2011/086281
PCT Pub. Date: Jul. 21, 2011

(65) Prior Publication Data
US 2012/0261521 A1 Oct. 18, 2012

(30) Foreign Application Priority Data

Dec. 22, 2009 (FR) ..................................... 09 59399

(51) Int. Cl.
*B64D 29/00* (2006.01)
*B64D 33/02* (2006.01)
(Continued)

(52) U.S. Cl.
CPC ................ *B64D 33/02* (2013.01); *B64D 29/00* (2013.01); *B64C 7/02* (2013.01); *B64D 29/06* (2013.01); *B64D 2033/0206* (2013.01)

(58) Field of Classification Search
CPC ............ B64C 7/00; B64C 7/02; B64D 29/00; B64D 29/06; B64D 33/02

USPC ............... 244/53 B, 54, 134 R, 134 B, 134 D
See application file for complete search history.

(56) References Cited

U.S. PATENT DOCUMENTS 4,738,416 A * 4/1988 Birbragher ................. 244/134 B
H648 H * 7/1989 Tran ........................... 244/134 B
(Continued)

FOREIGN PATENT DOCUMENTS

EP 1013910 A1 6/2000
EP 1357279 A2 10/2003
(Continued)

OTHER PUBLICATIONS

International Search Report, dated May 26, 2011, from corresponding PCT application No. PCT/FR2010/052837.

*Primary Examiner* — Tien Dinh
*Assistant Examiner* — Michael A Fabula
(74) *Attorney, Agent, or Firm* — Young & Thompson

(57) ABSTRACT

An aircraft nacelle includes a first subassembly consisting of a pipe (112) channeling an airflow in the direction of an engine having a covering or panel (118) for acoustic treatment, including, from the inside to the outside, a reflecting layer (120), at least one cellular structure (122), and at least one acoustically resistive structure (124) forming the aerodynamic surface of the pipe (112), as well as a second subassembly consisting of a lip (116) and a front frame (126), characterized in that it includes at least one connection element (134) which is separate from the two subassemblies and connected to a portion of the pipe (112) and to a portion of the lip forming an extension of the portion of the pipe at different points so as to be capable of enabling a relative movement between the two subassemblies.

4 Claims, 5 Drawing Sheets

(51) Int. Cl.
*B64D 29/06* (2006.01)
*B64C 7/02* (2006.01)

(56) References Cited

U.S. PATENT DOCUMENTS

| | | | |
|---|---|---|---|
| 5,390,878 A | * | 2/1995 | Padden ................. 244/53 R |
| 5,941,061 A | * | 8/1999 | Sherry et al. ................. 60/798 |
| 5,944,287 A | * | 8/1999 | Rodgers ................. 244/134 R |
| 6,328,258 B1 | | 12/2001 | Porte |
| 6,848,656 B2 | * | 2/2005 | Linton ................. 244/134 C |
| 8,197,191 B2 | * | 6/2012 | Binks et al. ................. 415/119 |
| 8,505,679 B2 | * | 8/2013 | Porte et al. ................. 181/214 |
| 2003/0163985 A1 | * | 9/2003 | Stretton et al. ................. 60/226.1 |
| 2012/0241249 A1 | * | 9/2012 | Porte et al. ................. 181/214 |

FOREIGN PATENT DOCUMENTS

| | | |
|---|---|---|
| FR | 2887519 A1 | 12/2006 |
| GB | 1427339 A | 3/1976 |

* cited by examiner

NACELLE INCORPORATING AN ELEMENT FOR CONNECTING A LIP AND AN ACOUSTIC ATTENUATION PANEL TOGETHER

BACKGROUND OF THE INVENTION

1. Field of the Invention

This invention relates to an aircraft nacelle that incorporates a junction element between a lip and an acoustic attenuation panel.

2. Description of the Related Art

An aircraft propulsion system comprises a nacelle in which a power plant that is connected by means of a mast, for example to the rest of the aircraft, is arranged in an essentially concentric manner.

Figure 1:
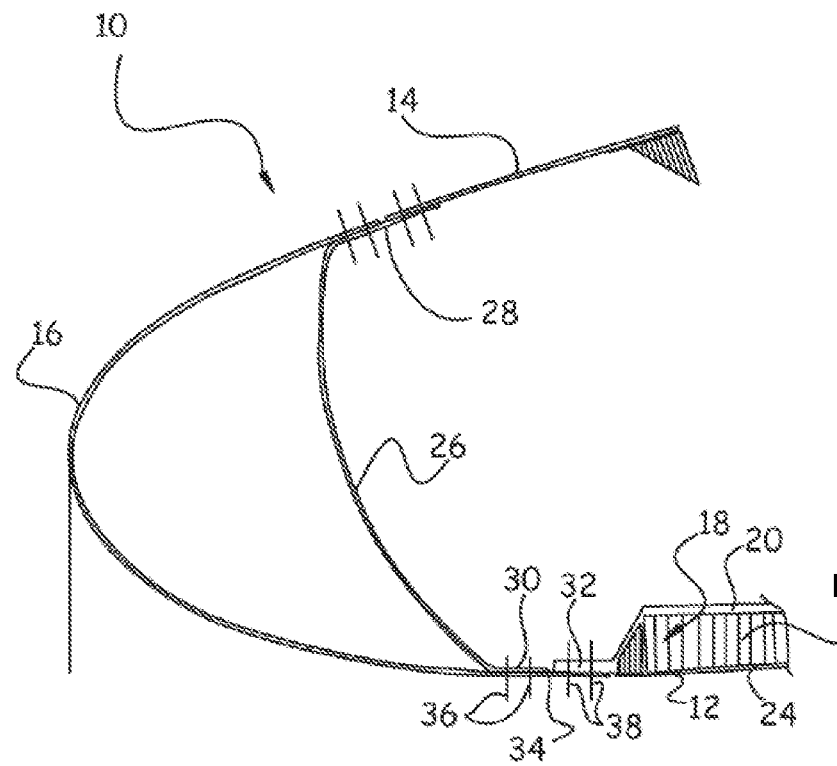

As illustrated in FIG. 1, the nacelle 10 comprises a pipe 12, a peripheral wall 14, and, at the front, an air intake that is bordered by a lip 16 that connects the pipe 12 and the peripheral wall 14.

The pipe 12 is connected at the rear to the power plant.

In a known manner, the pipe 12 comprises a covering or panel 18 for acoustic treatment that comprises—from the inside to the outside—a reflective layer 20, at least one alveolar structure 22, and at least one acoustically resistive structure 24 that forms the aerodynamic surface of the pipe 12. Advantageously, the lip 16 can also comprise a covering for acoustic treatment.

To reinforce the structure of the nacelle, a front frame 26 is made integral with the lip 16 and extends between the pipe 12 and the peripheral wall 14.

According to one embodiment, to provide the connection between the panel that forms the lip 16 and the panel that forms the peripheral wall 14, the edges of said panels are flattened and then attached by any suitable means against a flange 28 of the front frame 26.

At the junction zone of the lip 16 and the pipe 12, the end of the front frame 26, oriented toward the center of the nacelle, comprises a flange 30 that is oriented toward the rear, and the pipe 12 comprises a flange 32 that is essentially cylindrical. The lip 16 extends toward the rear by an extension 34.

According to an embodiment that is illustrated in FIG. 1, the flange 30 of the front frame is flattened and attached by attachment means 36 against the inside surface of the extension 34 of the lip 16, and the flange 32 of the pipe 12 is also flattened and attached by attachment means 38 against the inside surface of the extension 34 of the lip, with the flange 30 and the flange 32 being arranged side by side.

Figure 2:
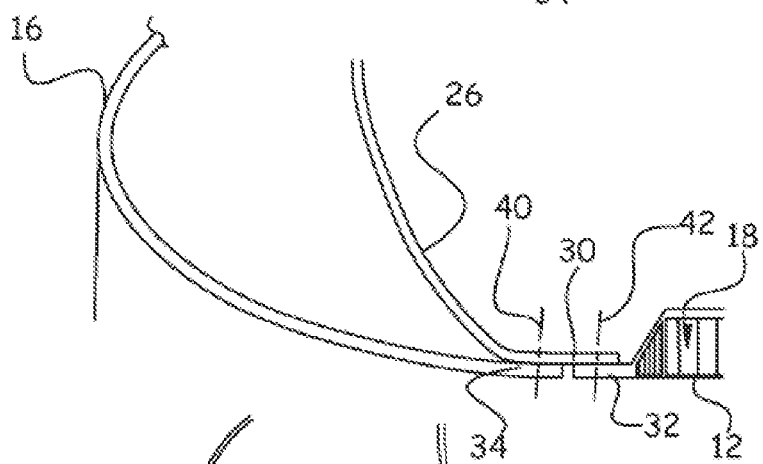

According to another embodiment that is illustrated in FIG. 2, the extension 34 of the lip 16 is flattened and attached by attachment means 40 against the outside surface of the flange 30 of the front frame, and the flange 32 of the pipe 12 is also flattened and attached by attachment means 42 against the outside surface of the flange 30 of the front frame, with the flange 32 and the extension 34 being arranged side by side.

Figure 3:
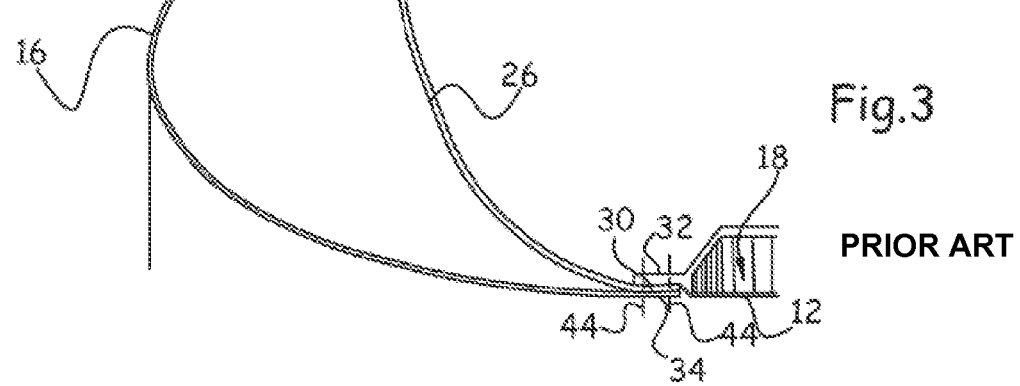

According to another embodiment that is illustrated in FIG. 3 and in the document FR-2,887,519 for reducing the length of the junction zone in the longitudinal direction, the flange 30 of the front frame is flattened against the inside surface of the extension 34 of the lip 16, and the flange 32 of the pipe 12 is flattened against the inside surface of the flange 30 of the front frame, with the unit being made integral by attachment means 44.

In all of the embodiments mentioned above, the lip, the frame and the pipe are connected directly.

In general, the pipe 12 consists of several panels that are assembled with one another, forming a first essentially rigid subassembly that is essentially cylindrical in shape.

In parallel, the lip 16 and the front frame 26 are assembled in such a way as to form a second essentially rigid subassembly of which an essentially cylindrical peripheral edge that is oriented toward the rear is to be assembled with the pipe 12. Next, these two subassemblies are to be assembled.

To produce this assembly, the two subassemblies are to have dimensions with reduced tolerance intervals at their junction zones so that they can be assembled taking into account certain rigidities therein. However, these reduced tolerance intervals lead to increasing the costs and/or the manufacturing period of these two subassemblies.

As a variant, it is possible to increase the tolerance intervals of each of the subassemblies and to compensate for the dimensional dispersions by blocks inserted between the two subassemblies. However, this solution tends to increase the duration and/or the costs of the assembly.

The document GB-1,427,339 describes an air intake with a lip that comprises panels that form preferred rupture zones on the outside and a pipe with a preferred rupture zone at the rear part. The lip and the pipe are connected by a front frame, with the latter being able to deform in the shape of a cone in case of impact. This front frame does not make possible a relative movement between the inside pipe and the portion of the lip that is arranged in the extension of the inside pipe since these three elements are connected to one another at the same point.

SUMMARY OF THE INVENTION

Also, the purpose of this invention is to remedy the drawbacks of the prior art by proposing a nacelle that incorporates a junction element, also called a bridge, inserted between a lip and a pipe that consists of at least one acoustic panel.

For this purpose, the invention has as its object an aircraft nacelle that comprises, on the one hand, a first subassembly that consists of a pipe that channels an air flow in the direction of a power plant with a covering or panel for acoustic treatment that comprises—from the inside to the outside—a reflective layer, at least one alveolar structure, and at least one acoustically resistive structure that forms the aerodynamic surface of the pipe, and, on the other hand, a second subassembly that consists of a lip and a front frame, with the surface of the pipe coming into contact with the channeled air flow that comes into the extension of the surface of the lip that is in contact with said flow, characterized in that it comprises at least one junction element that is independent of the two subassemblies, connected, on the one hand, to a portion of the pipe and, on the other hand, to a portion of the lip that is arranged in the extension of said portion of the pipe at two different points in such a way as to be able to provide a relative movement between the two subassemblies.

BRIEF DESCRIPTION OF THE DRAWING FIGURES

Figure 4:
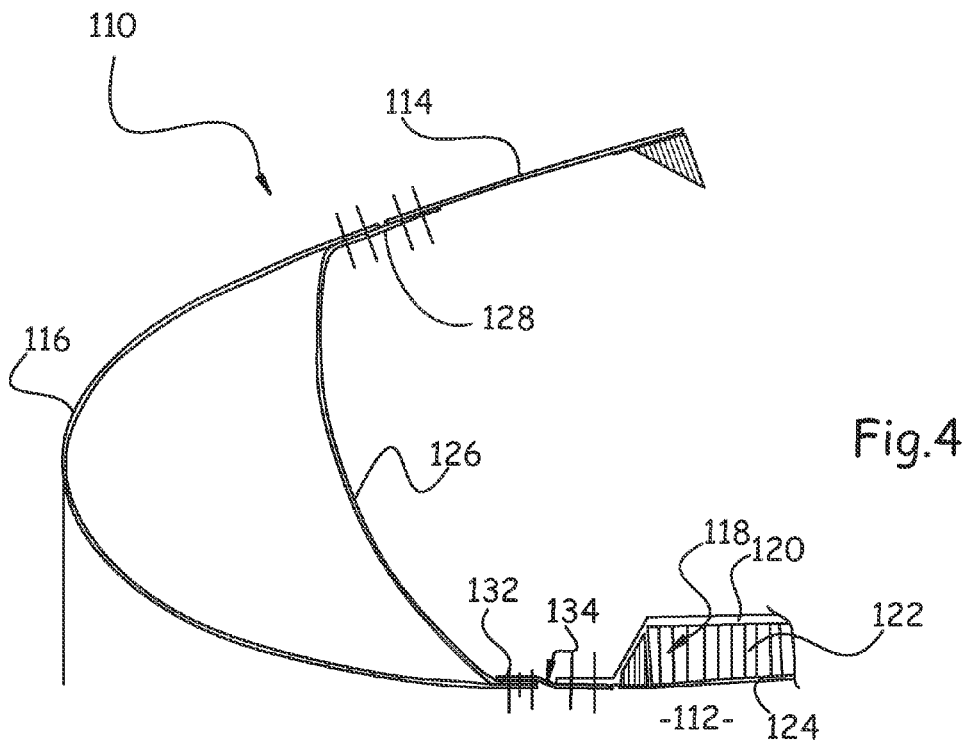
Figure 5:
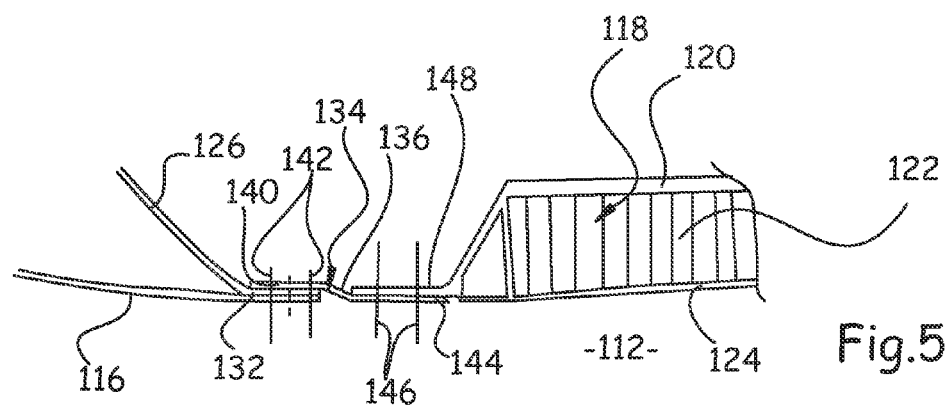
Figure 6:
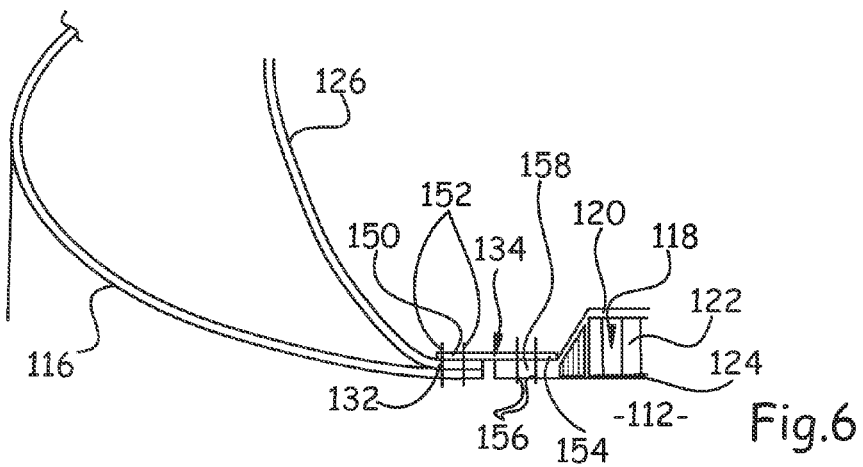
Figure 7:
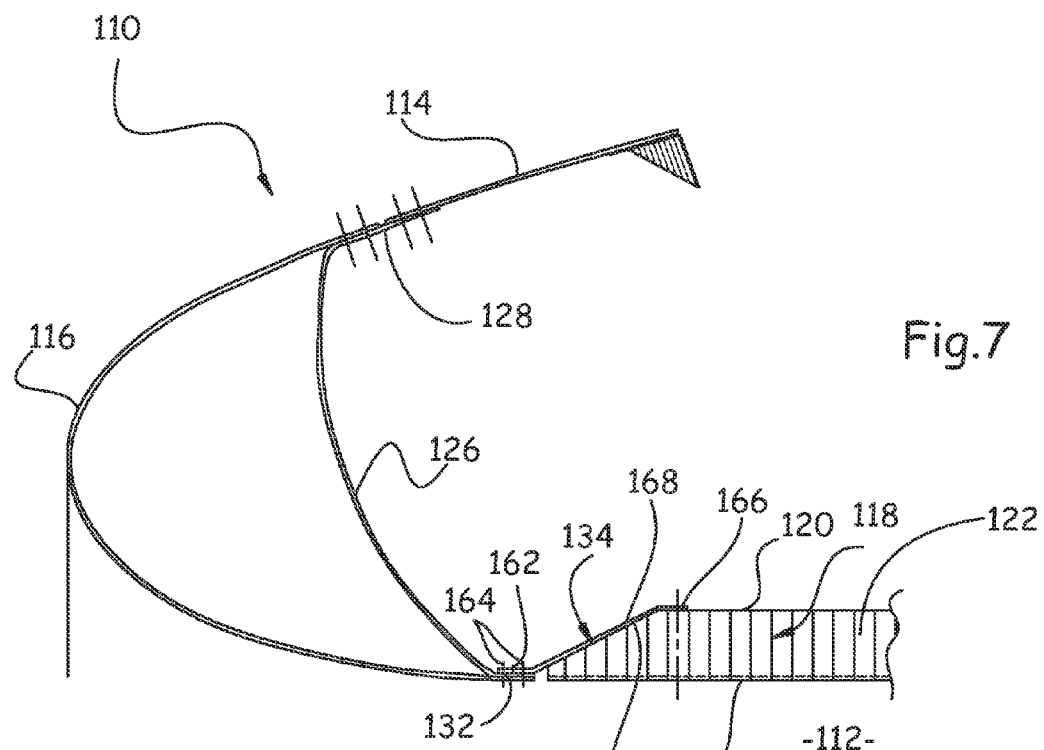
Figure 8:
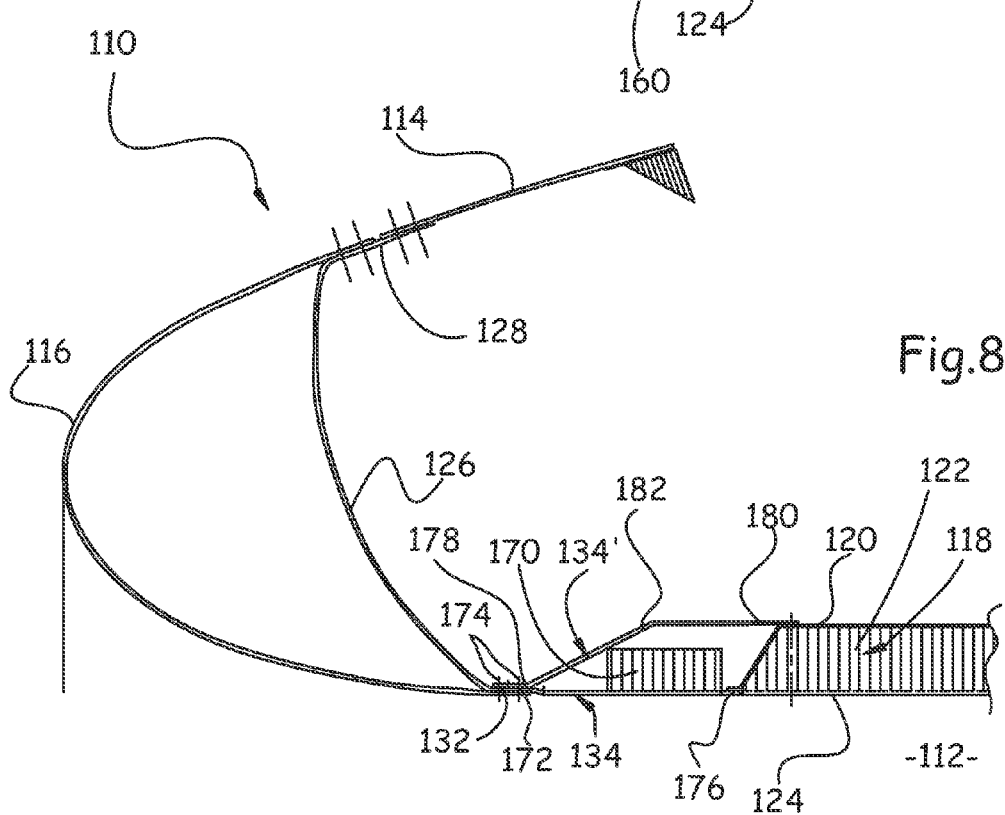
Figure 9:
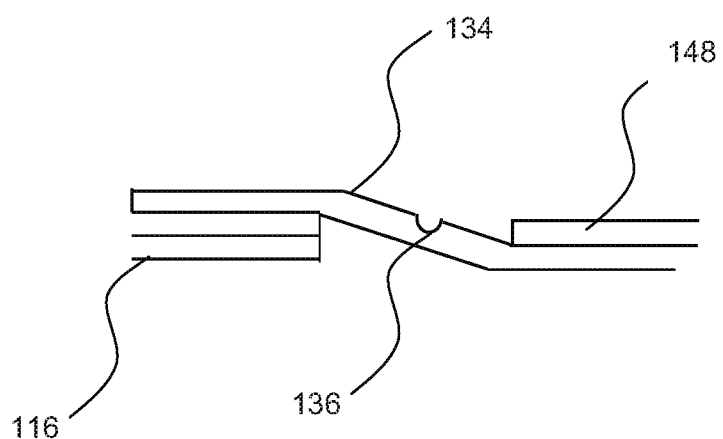
Figure 10:
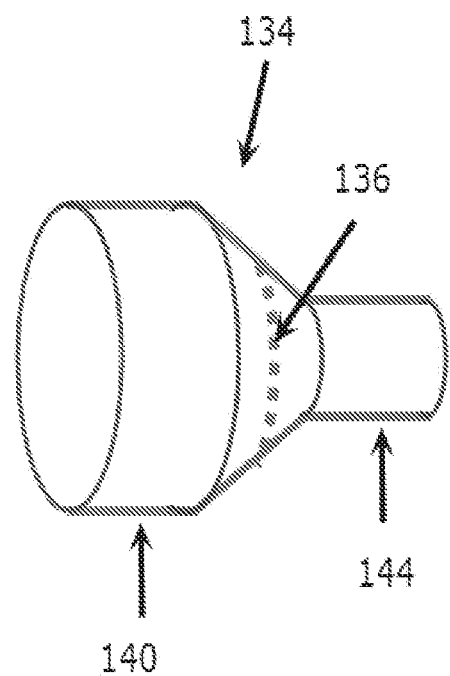

Other characteristics and advantages will emerge from the following description of the invention, a description that is provided only by way of example relative to the accompanying drawings in which:

FIG. 1 is a cutaway of the front of an aircraft nacelle according to a first embodiment of the prior art, FIG. 2 is a cutaway of the front of an aircraft nacelle according to another embodiment of the prior art, FIG. 3 is a cutaway of the front of an aircraft nacelle according to another embodiment of the prior art, FIG. 4 is a cutaway of the front of an aircraft nacelle that illustrates a mode of assembly of a lip and a pipe according to the invention, FIG. 5 is a cutaway that illustrates in detail the junction zone between the lip and the pipe of FIG. 4, FIG. 6 is a cutaway that illustrates in detail another embodiment according to the invention of the assembly of a lip and a pipe of an aircraft nacelle, FIG. 7 is a cutaway that illustrates in detail another embodiment according to the invention of the assembly of a lip and a pipe of an aircraft nacelle, FIG. 8 is a cutaway that illustrates in detail another embodiment according to the invention of the assembly of a lip and a pipe of an aircraft nacelle, FIG. 9 is a magnified view of FIG. 5, and FIG. 10 is a magnified view of the junction element including cylindrical parts.

DETAILED DESCRIPTION OF THE INVENTION

FIG. 4 shows a portion of the front of an aircraft nacelle 110 that comprises a pipe 112 that channels an air flow in the direction of a power plant, not shown, a peripheral wall 114, and, at the front, an air intake that is bordered by a lip 116 that connects the pipe 112 and the peripheral wall 114.

The pipe 112 comprises a covering or panel 118 for acoustic treatment that comprises—from the inside to the outside—a reflective layer 120, at least one alveolar structure 122, and at least one acoustically resistive structure 124 that forms the aerodynamic surface of the pipe 112.

The pipe 112 can comprise several panels 118 for acoustic treatment that are connected to one another.

The lip 116 can also comprise a covering for acoustic treatment.

The nacelle also comprises a front frame 126 that is made integral with the lip 116, extending between the pipe 112 and the peripheral wall 114.

According to one embodiment, to provide the connection between the panel that forms the lip 116 and the panel that forms the peripheral wall 114, the edges of said panels are flattened and then attached by any suitable means against a flange 128 of the front frame 126.

The end of the front frame 126 that is oriented toward the center of the nacelle comprises a flange 132 that is oriented toward the rear, flattened and attached by attachment means to the inside surface of the edge of the panel that forms the lip 116.

The elements that constitute the pipe 112 are assembled in such a way as to form a first subassembly to connect to a second subassembly that consists of the lip 116 and the front frame 126.

According to the invention, the nacelle comprises at least one junction element 134 that is independent of the two subassemblies that make it possible to assemble the first subassembly with the second subassembly.

This junction element 134 can become deformed in such a way as to allow the assembly of two subassemblies although the dimensional tolerances can be greater for the zones of the subassemblies that have to be assembled. In addition, because of the capability of the junction element to deform, assembly can be done without a block.

This junction element 134 comes in the form of a circular strip of which a first upstream part (in the direction of flow of the air) is connected to the second subassembly, whereas the second downstream part is connected to the first subassembly.

According to another characteristic, the junction element 134 is made of a material that has an elongation coefficient that is greater than 5%.

According to one embodiment, the junction element 134 is made of titanium.

Owing to this characteristic, the junction element provides the shock absorption function. Thus, in the case of frontal impact at the air intake, the junction element 134 deforms to absorb a portion of the energy of the impact and reduces the risk of damage to the air intake or the pipe.

Advantageously, the junction element 134 comprises rupture means between the first part that is connected to the second subassembly and the second part that is connected to the first subassembly in such a way as to promote rupture in case of excessive stresses imposed on it, between the two subassemblies. This solution makes it possible to preserve the two subassemblies, which tends to reduce the maintenance and repair costs. According to one embodiment, the rupture means comprise a rupture line 136, for example a furrow, extending over at least a portion of the periphery of the pipe and preferably over its entire periphery.

According to a first embodiment that is illustrated in FIGS. 4, 5, 9 and 10, the junction element 134 comprises a first cylindrical part 140 whose diameter is adapted so that said first part is flattened and attached by connecting means 142 to the inside surface of the flange 132 of the front frame. In addition, the junction element 134 comprises a second cylindrical part 144 whose diameter is adapted so that it is flattened and attached by connecting means 146 to the outside surface of an extension 148 that is provided at the end of the pipe 112.

The two cylindrical parts 140 and 144 are connected by a conical portion at which the rupture line 136 is provided.

According to another embodiment that is illustrated in FIG. 6, the junction element 134 comprises a first cylindrical part 150 whose diameter is adapted so that it is flattened and attached by connecting means 152 to the inside surface of the flange 132 of the front frame. In addition, the junction element 134 comprises a second cylindrical part 154 whose diameter is adapted so that it is flattened and attached by connecting means 156 to the inside surface of an extension 158 that is provided at the end of the pipe 112. According to this embodiment, the two cylindrical parts 150 and 154 have the same diameter and are connected by a cylindrical portion that integrates the rupture line 136.

According to these two variants, the junction element 134, also called bridge, is relatively short in the longitudinal direction of the nacelle.

According to another embodiment that is illustrated in FIG. 7, close to its end that is oriented toward the lip 116, the reflective layer 120 comprises a slightly inclined face 160 in such a way as to provide acoustic treatment over the entire length of the pipe 112. In this case, the junction element 134 comprises a first cylindrical part 162 whose diameter is adapted so that it is flattened and attached by connecting means 164 to the inside surface of the flange 132 of the front frame. In addition, the junction element 134 comprises a second cylindrical part 166 that is flattened and attached to the inside surface of the reflective layer at the cylindrical portion of the reflective layer 120.

A conical portion 168 provides the connection between the two cylindrical parts 162 and 166 and covers the inclined plane 160 of the reflective layer 120. Thus, this conical portion 168 provides the heat barrier function and protects the acoustic treatment panel 118 made of composite material from thermal radiation emitted by the front frame 126.

According to another embodiment that is illustrated in FIG. 8, the nacelle comprises two junction elements 134 and 134'.

The first junction element 134 can comprise an acoustic treatment panel 170. Upstream, it comprises a first cylindrical part 172 whose diameter is adapted so that it is flattened and attached by connecting means 174 to the inside surface of the flange 132 of the front frame, and downstream, it comprises a second cylindrical part 176 that is flattened and attached to the outside surface of the acoustic panel 118.

The second junction element 134' comprises a first cylindrical part 178 whose diameter is adapted so that it is flattened and attached by connecting means to the inside surface of the first junction element 134 facing the flange 132 of the front frame. In addition, the second element 134' comprises a second cylindrical part 180 that is flattened and attached to the inside surface of the reflective layer 120 of the panel 118, with a conical portion 182 providing the connection between the cylindrical parts 178 and 180.

According to this last embodiment, the acoustic treatment panel 118 that is made of composite material is removed from the front frame although the impact of the thermal radiation emitted by said frame is limited.

The acoustic treatment panel 170 that is incorporated with the junction element 134 is made of a heat-resistant material. The presence of this panel 170 makes it possible to optimize the acoustic treatment by increasing the area of treated surfaces.

According to this embodiment, the two junction elements 134, 134' form a Y whose foot is formed by the cylindrical parts 172 and 178 that are connected by the same means to the second subassembly, whereas the branches that are formed respectively by the second cylindrical parts 176 and 180 are independent before the mounting, which makes it possible to obtain a better adaptability of the junction elements 134, 134' to the subassemblies.

The invention claimed is:

1. An aircraft nacelle comprising:
 a first subassembly formed from a pipe that channels an air flow in a direction of a power plant;
 a covering or panel for the first subassembly configured for acoustic treatment that comprises, from inside to outside:
  a reflective layer,
  at least one honeycomb structure, and
  at least one acoustically resistive structure that forms an aerodynamic surface of the pipe;
 a second subassembly formed from:
  a lip, and
  a front frame; and
 a deformable junction element that is independent from the two subassemblies, connected to a portion of the pipe, and connected to a portion of the lip that is arranged in said portion of the pipe at different points so as to permit the deformable junction element to deform to absorb a portion of impact energy in accordance with an elongation coefficient of the deformable junction element, the deformable junction element comprising:
  a first cylindrical part flattened and attached to an inside surface of a flange of the second subassembly, and
  a second cylindrical part flattened and attached to an outside surface of an extension of the pipe,
  wherein said first and second cylindrical parts are connected by a conical portion.

2. The aircraft nacelle according to claim 1, further comprising:
 a first connector attaching the first cylindrical part to the inside surface of the flange of the front frame; and
 a second connector attaching the second cylindrical part to the outside surface of the extension at the end of the pipe.

3. The aircraft nacelle according to claim 1, wherein the deformable junction element is formed from titanium.

4. An aircraft nacelle comprising:
 a first subassembly formed from a pipe that channels an air flow in a direction of a power plant;
 a covering or panel for the first subassembly configured for acoustic treatment that comprises, from inside to outside:
  a reflective layer,
  at least one honeycomb structure, and
  at least one acoustically resistive structure that forms an aerodynamic surface of the pipe;
 a second subassembly formed from:
  a lip, and
  a front frame; and
 a deformable junction element that is independent from the two subassemblies, connected to a portion of the pipe, and connected to a portion of the lip that is arranged in said portion of the pipe at different points so as to permit the deformable junction element to deform to absorb a portion of impact energy in accordance with an elongation coefficient of the deformable junction element, the deformable junction element comprising:
  a first cylindrical part connected to the second subassembly, and
  a second cylindrical part connected to the portion of the pipe,
  wherein said first and second cylindrical parts are connected by a cylindrical or conical portion, and
  wherein the interconnecting cylindrical or conical portion comprises a rupture line.

* * * * *